US008312703B2

(12) United States Patent
Aoyama et al.

(10) Patent No.: US 8,312,703 B2
(45) Date of Patent: Nov. 20, 2012

(54) SOLAR-THERMAL GAS TURBINE GENERATOR

(75) Inventors: Kuniaki Aoyama, Tokyo (JP); Kei Inoue, Tokyo (JP); Kazuta Kobayashi, Tokyo (JP); Masashi Tagawa, Tokyo (JP); Toshiyuki Osada, Tokyo (JP); Manabu Maeda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/123,777

(22) PCT Filed: Jun. 4, 2010

(86) PCT No.: PCT/JP2010/059504
§ 371 (c)(1),
(2), (4) Date: May 6, 2011

(87) PCT Pub. No.: WO2010/147003
PCT Pub. Date: Dec. 23, 2010

(65) Prior Publication Data
US 2011/0233940 A1    Sep. 29, 2011

(30) Foreign Application Priority Data
Jun. 15, 2009    (JP) .................................. 2009-142183

(51) Int. Cl.
*F02C 6/00*    (2006.01)
(52) U.S. Cl. ................. 60/39.182; 60/641.8; 60/641.15; 60/650; 60/676; 60/682
(58) Field of Classification Search ............... 60/39.182, 60/641.8, 641.15, 650, 676, 682–683
See application file for complete search history.

(56) References Cited

U.S. PATENT DOCUMENTS

| 5,417,052 A | 5/1995 | Bharathan et al. |
| 5,444,972 A * | 8/1995 | Moore ........................ 60/39.182 |

(Continued)

FOREIGN PATENT DOCUMENTS

EP    1793181 A1    6/2007

(Continued)

OTHER PUBLICATIONS

International Search Report of PCT/JP2010/059504, mailing date Aug. 24, 2010.

(Continued)

*Primary Examiner* — Hoang Nguyen
(74) *Attorney, Agent, or Firm* — Westerman, Hattori, Daniels & Adrian, LLP

(57) ABSTRACT

A solar-thermal gas turbine generator is equipped with a compressor, a heat receiver, and a turbine. Additionally, there is a generator that is driven by the solar-thermal gas turbine to generate power; and a steam power generation cycle in which high-temperature air exhausted from the turbine is introduced into a steam generator and in which a steam turbine that is operated with steam generated at the steam generator drives a generator to generator power, wherein a solar-thermal steam generator that generates steam by being heated with heat collected by the light collector is provided upstream of the steam turbine of the steam power generation cycle, and a distribution ratio for distributing the sunlight collected by the light collector to the heat receiver and the solar-thermal steam generator is adjusted in accordance with the sunlight intensity.

4 Claims, 4 Drawing Sheets

U.S. PATENT DOCUMENTS

| | | | |
|---|---|---|---|
| 5,727,379 A * | 3/1998 | Cohn | 60/39.182 |
| 6,000,211 A * | 12/1999 | Bellac et al. | 60/775 |
| 6,237,337 B1 * | 5/2001 | Bronicki et al. | 60/641.12 |
| 6,321,539 B1 | 11/2001 | Bronicki et al. | |
| 7,845,172 B2 * | 12/2010 | Goldman | 60/641.8 |
| 2004/0244376 A1 | 12/2004 | Litwin et al. | |
| 2005/0279095 A1 | 12/2005 | Goldman | |
| 2009/0173337 A1 | 7/2009 | Tamaura et al. | |

FOREIGN PATENT DOCUMENTS

| | | |
|---|---|---|
| GB | 2 449 181 A | 11/2008 |
| JP | 62-017642 B2 | 4/1987 |
| JP | 2005-077050 A | 3/2005 |
| WO | 2006/025449 A1 | 3/2006 |

OTHER PUBLICATIONS

Written Opinion of PCT/JP2010/059504, mailing date Aug. 24, 2010.

Search Report issued Sep. 11, 2012, in corresponding European Patent Application No. 10789378.6.

* cited by examiner

SOLAR-THERMAL GAS TURBINE GENERATOR

TECHNICAL FIELD

The present invention relates to a solar-thermal gas turbine generator driven by using a compressible working fluid, such as air or the like, that is heated using sunlight.

BACKGROUND ART

In recent years, in order to solve environmental problems such as global warming, etc., natural energy, such as sunlight, wind power, and so on, has received much attention.

Accordingly, solar-thermal gas turbine generators have been proposed, in which sunlight, which is one form of natural energy, is used to heat a high-pressure compressible working fluid with the heat of the sunlight to drive a solar-thermal gas turbine, which, in turn, drives a generator to generate power.

A solar-thermal gas turbine generator P shown in FIG. 4 is provided with a solar-thermal gas turbine GT whose main constituent components are a compressor 1 that raises the pressure of a compressible working fluid by compressing it, a heat receiver 2 that raises the temperature of the compressible working fluid by heating it with heat converted from the sunlight, and a turbine 3 that converts heat energy held by the high-temperature, high-pressure compressible working fluid into mechanical energy. This solar-thermal gas turbine GT is combined-cycle power generating equipment that is provided with a steam power generation cycle 20 that generates power by driving a generator 4 and also generates power by using exhaust heat of the solar-thermal gas turbine GT.

That is, the solar-thermal gas turbine generator P is combined-cycle power generating equipment that employs the solar-thermal gas turbine GT operated by including the heat receiver 2, which heats a compressible working fluid to raise its temperature using the heat energy of sunlight, instead of a combustor that generates a high-pressure combustion gas by combusting fuel, such as natural gas or the like.

The above-described heat receiver 2 is a device for converting sunlight into the heat energy and is capable of raising the temperature of a high-pressure compressible working fluid by heating it with the heat of light focused using a light collector (heliostat) H. A solar-thermal gas turbine generator P shown in FIG. 4 is provided with a re-heater (not shown) for preheating the high-pressure compressible working fluid whose pressure has been raised by the compressor 1, using the exhaust heat of the compressible working fluid that has done work at the turbine 3.

The steam power generation cycle 20 introduces high-temperature air exhausted from the turbine 3 into a steam generator 21, thus heating water in the steam generator 21 to generate steam. The steam generated in the steam generator 21 is supplied to a steam turbine 22, and the steam turbine 22 operated by this steam drives a generator 23 to generate power.

The steam that has done work at the steam turbine 22 is returned to water upon passing through a condenser 24 and then is supplied again to the steam generator 21. Therefore, the water that is heated at the steam generator 21 by the air exhausted from the turbine 3 circulates in a closed-circuit piping flow path, undergoing repeated state changes between water and steam. The air that has been used to generate steam at the steam generator 21 is exhausted to the atmosphere from a chimney 5.

In addition to this, in related art of power generating facility that uses sunlight, packaged power generating facility that drives a turbine with steam generated with the sunlight has been proposed (for example, see Patent Literature 1).

{Citation List}
{Patent Literature}
{PTL 1} The Publication of Japanese Examined Patent Application, Publication No. Sho 62-017642.

SUMMARY OF INVENTION

{Technical Problem}

A property of the above-described conventional solar-thermal gas turbine generator is that a decrease in sunlight intensity causes thermal efficiency thereof to decrease. In particular, when the sunlight intensity decreases to 40 to 50% of a design point or less, continued operation becomes difficult due to the characteristics of the solar-thermal gas turbine GT that uses the heat of sunlight. Because of this, there is a demand for improving the thermal efficiency by making it possible to generate power with a steam turbine, even in a state in which the operation of a solar-thermal gas turbine is stopped due to decreased sunlight intensity.

The present invention has been conceived in view of the above-described situations, and an object thereof is to provide a solar-thermal gas turbine generator in which the thermal efficiency thereof is improved by making it possible to generate power with a steam turbine, even in a state in which the operation of the solar-thermal gas turbine is stopped due to decreased sunlight intensity.

{Solution To Problem}

In order to solve the above-described problems, the present invention employs the following solutions.

A solar-thermal gas turbine generator of the present invention is provided with a solar-thermal gas turbine equipped with a compressor that takes in a compressible working fluid to raise a pressure thereof, a heat receiver that raises a temperature of the compressed working fluid by heating the working fluid with heat of sunlight collected by a light collector, and a turbine that converts heat energy held by a high-temperature, high-pressure compressible working fluid into mechanical energy; a generator that is driven by the solar-thermal gas turbine to generate power; and a steam power generation cycle in which the high-temperature compressible working fluid exhausted from the turbine is introduced into a steam generator, and in which a steam turbine that is operated by steam generated at the steam generator drives the generator to generate power, wherein a solar-thermal steam generator that generates steam by being heated with heat collected by the light collector is provided upstream of the steam turbine of the steam power generation cycle, and a distribution ratio for distributing the sunlight collected by the light collector to the heat receiver and the solar-thermal steam generator is adjusted in accordance with sunlight intensity.

According to such a solar-thermal gas turbine generator, the solar-thermal steam generator is provided upstream of the steam turbine of the steam power generation cycle, and the distribution ratio for distributing the sunlight collected by the light collector to the heat receiver and the solar-thermal steam generator is adjusted according the sunlight intensity; therefore, under operating conditions in which the sunlight intensity is high, power can be generated with both the solar-thermal gas turbine and the steam turbine by concentrating the sunlight on the heat receiver, and, under operating conditions in which the sunlight intensity is low, power can be generated with the steam turbine by concentrating the sunlight on the solar-thermal steam generator.

In the above-described solar-thermal gas turbine generator, it is also possible to provide a cooling-steam supply flow path that performs cooling by supplying steam generated at the solar-thermal steam generator to the heat receiver; by doing so, it becomes possible to cool the heat receiver and also to recover the amount of heat absorbed through cooling at the steam turbine.

In the above-described solar-thermal gas turbine generator, it is also possible to provide the solar-thermal gas turbine with a fossil-fuel-fired auxiliary combustor, and to provide a cooling-steam supply flow path that performs cooling by supplying steam generated at the solar-thermal steam generator to the auxiliary combustor; by doing so, it becomes possible to cool the heat receiver and the auxiliary combustor and also to recover the amount of heat absorbed through cooling at the steam turbine.

{Advantageous Effects of Invention}

According to the present invention described above, because it becomes possible to generate power using only the steam turbine when the solar heat intensity decreases, a considerable advantage is afforded in that the thermal efficiency of a solar-thermal gas turbine generator that generates power by using sunlight, which is natural energy, is enhanced.

DESCRIPTION OF EMBODIMENTS

An embodiment of a solar-thermal gas turbine generator according to the present invention will be described below on the basis of the drawings.

Figure 1:
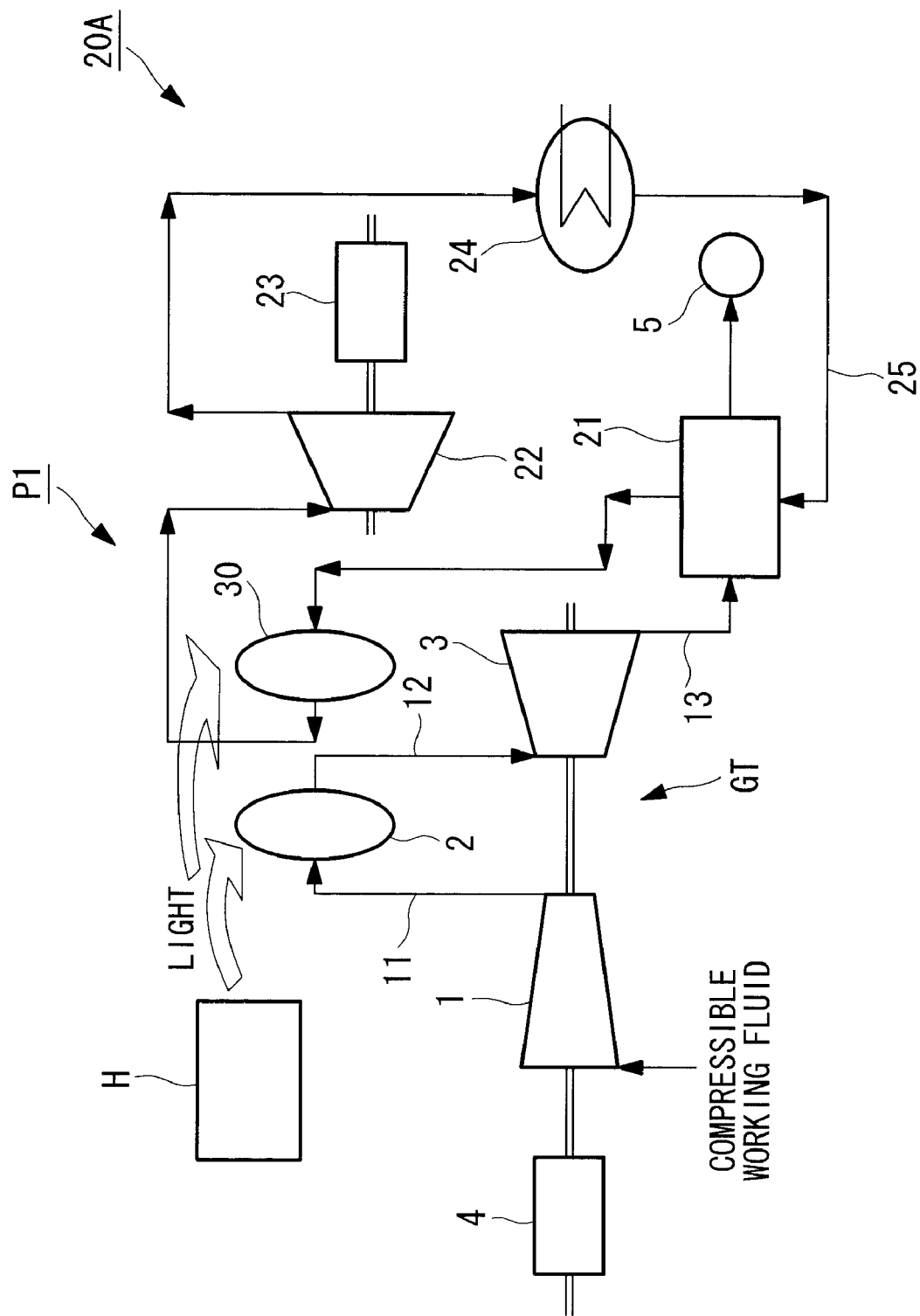
FIG. 1 is a configuration diagram (system diagram) showing an embodiment of a solar-thermal gas turbine generator according to the present invention.

In the embodiment shown in FIG. 1, a solar-thermal gas turbine generator P1 is provided with a solar-thermal gas turbine GT that is driven by raising the temperature of a high-pressure compressible working fluid by heating it with the heat of sunlight, a generator 4 that is driven by this solar-thermal gas turbine GT to generate power, and a steam power generation cycle 20A that generates power by using exhaust heat of the solar-thermal gas turbine GT.

The solar-gas turbine GT is configured to be equipped with a compressor 1 that takes in the compressible working fluid to raise its pressure, a heat receiver 2 that raises the temperature of the compressible working fluid, whose pressure has been raised at the compressor 1, by heating it with the heat of sunlight collected at a light collector H, and a turbine 3 that converts thermal energy held by the high-temperature, high-pressure, compressible working fluid into mechanical energy.

The compressor 1 is a device that takes in the compressible working fluid to compress it to a desired high pressure and is driven by using part of the output generated by a coaxial turbine 3. As the compressible working fluid to be compressed at the compressor 1, for example, air taken in from the atmosphere is used. In the following descriptions, descriptions will be given assuming the compressible working fluid to be air; however, it is not limited thereto.

The air that is the compressible working fluid whose pressure has been raised at the compressor 1 is guided to the heat receiver 2 via a high-pressure air flow path 11. The heat receiver 2 is a device that is disposed at the top portion of a tower (not shown) to convert the sunlight to heat energy. Since the high-pressure air is heated using the heat of light collected by the light collector H, whose main constituent components are numerous mirrors disposed on the ground, the temperature of the high-pressure air can be raised. That is, the heat receiver 2 is a heating device that, by causing light from the light collector H to shine on numerous pipes in which the high-pressure air flows, raises the temperature of the pipes as well as the high-pressure air in the pipes by heating them.

The high-pressure air heated at the heat receiver 2 turns into high-temperature, high-pressure air having, for example, an outlet temperature of about 900° C., and is supplied to the turbine 3 via a high-temperature, high-pressure air flow path 12.

The high-temperature, high-pressure air supplied to the turbine 3 expands when passing through between the rotor blades and the stator blades in the turbine, thus rotating a turbine shaft which is integrated with the rotor blades, generating turbine output. The output generated at the turbine 3 is used as a driving force for the compressor 1 and the generator 4 that are coaxially connected. The high-temperature, high-pressure air that has done work at the turbine 3 turns into high-temperature air (hereinafter, also referred to as "expanded air") whose pressure and temperature have become lower than those at the turbine inlet and is guided to a steam generator 21 of the steam power generation cycle 20A via an exhaust air flow path 13. Since heat is absorbed from this expanded air to generate steam at the steam generator 21, the temperature thereof is further decreased and is released into the atmosphere from a chimney 5.

The steam power generation cycle 20A introduces the expanded air exhausted from the turbine 3 into the steam generator 21 and heats the water in the steam generator 21 to generate steam. The steam generated at the steam generator 21 is supplied to a steam turbine 22 via a solar-thermal steam generator 30 which is described later, and the steam turbine 22 operated by this steam drives a generator 23 to generate power.

The steam that has done work in the steam turbine 22 is returned to water upon passing through a surface condenser 24, and is then supplied again to the steam generator 21. Therefore, the water that is heated by the expanded air at the steam generator 21 circulates in a closed-circuit piping flow path 25, undergoing repeated state changes between water and steam.

In this way, the solar-thermal gas turbine generator P1 provided with the steam power generation cycle 20A effectively uses the heat energy held by the high-temperature, high-pressure expanded air exhausted from the turbine 3, thereby making it possible to enhance the thermal efficiency of the apparatus as a whole. In other words, instead of directly releasing the expanded air exhausted from the turbine 3 into the atmosphere from the chimney 5, heat is recovered by the steam generation for operating the steam turbine 22, and thus, the amount of power generated by the generator 23 driven by the steam turbine 22 is obtained in addition to the amount of power generated by the generator 4 driven by the turbine 3, which achieves enhanced thermal efficiency.

In addition, in the steam power generation cycle 20A of this embodiment described above, the solar-thermal steam generator 30 that is provided in series upstream of the steam generator 22 with the steam generator 21 generates steam by being heated with heat collected by the light collector H. That is, the solar-thermal steam generator 30 provided in the closed-circuit piping flow path 25 can heat the fluid (water or steam) flowing in the piping flow path 25 by receiving the sunlight collected by the light collector H.

The light collector H in this case is configured so that a distribution ratio of the sunlight to the heat receiver 2 and the solar-thermal steam generator 30 can be appropriately adjusted by adjusting mirror angles. In other words, the heat receiver 2 and the solar-thermal steam generator 30 are disposed, for example, at adjacent positions in the tower, so that the distribution ratio of the sunlight focused from the light collector can be changed in accordance with the mirror angle adjustment.

Here, heating of the solar-thermal steam generator 30 will be specifically described.

First, under operating conditions with adequate sunlight intensity, steam generated at the steam generator 21 is reheated, and the superheated steam is used. That is, for example, under operating conditions in which the sunlight intensity is at about 80% of a design point or greater, the mirror angles of the light collector H are changed so as to focus most (for example, 80% or above) of the sunlight on the heat receiver 2 side. As a result, sunlight that can be focused on the solar-thermal steam generator 30 side is eliminated or in a reduced state; therefore, the steam that drives the steam turbine 22 is generated at the steam generator 21, utilizing used expanded air of the steam turbine 3, and the solar-thermal steam generator 30 merely superheats the steam in accordance with the distributed sunlight.

Next, under operating conditions with inadequate sunlight intensity, steam generated at the solar-thermal steam generator 30 is used. That is, for example, under operating conditions in which the sunlight intensity is at about 40 to 50% of the design point or less, the mirror angles of the light collector H are changed so as to focus all (100%) of the sunlight on the solar-thermal steam generator 30 side. As a result, sunlight focused on the heat receiver 2 is eliminated, thereby stopping the operation of the solar-thermal gas turbine GT, and the steam that drives the steam turbine 22 is generated at the solar-thermal steam generator 30 solely using the sunlight.

In this way, in the solar-thermal gas turbine generator P1 of this embodiment, by providing the solar-thermal steam generator 30, the distribution ratio for distributing the sunlight collected by the light collector H to the heat receiver 2 and the solar-thermal steam generator 30 is adjusted according to the sunlight intensity, so that, even under operating conditions in which the sunlight intensity is low, for example, about 20 to 60% of the design point, power can be generated using the steam turbine 22 by concentrating the sunlight on the solar-thermal steam generator 30.

Figure 2:
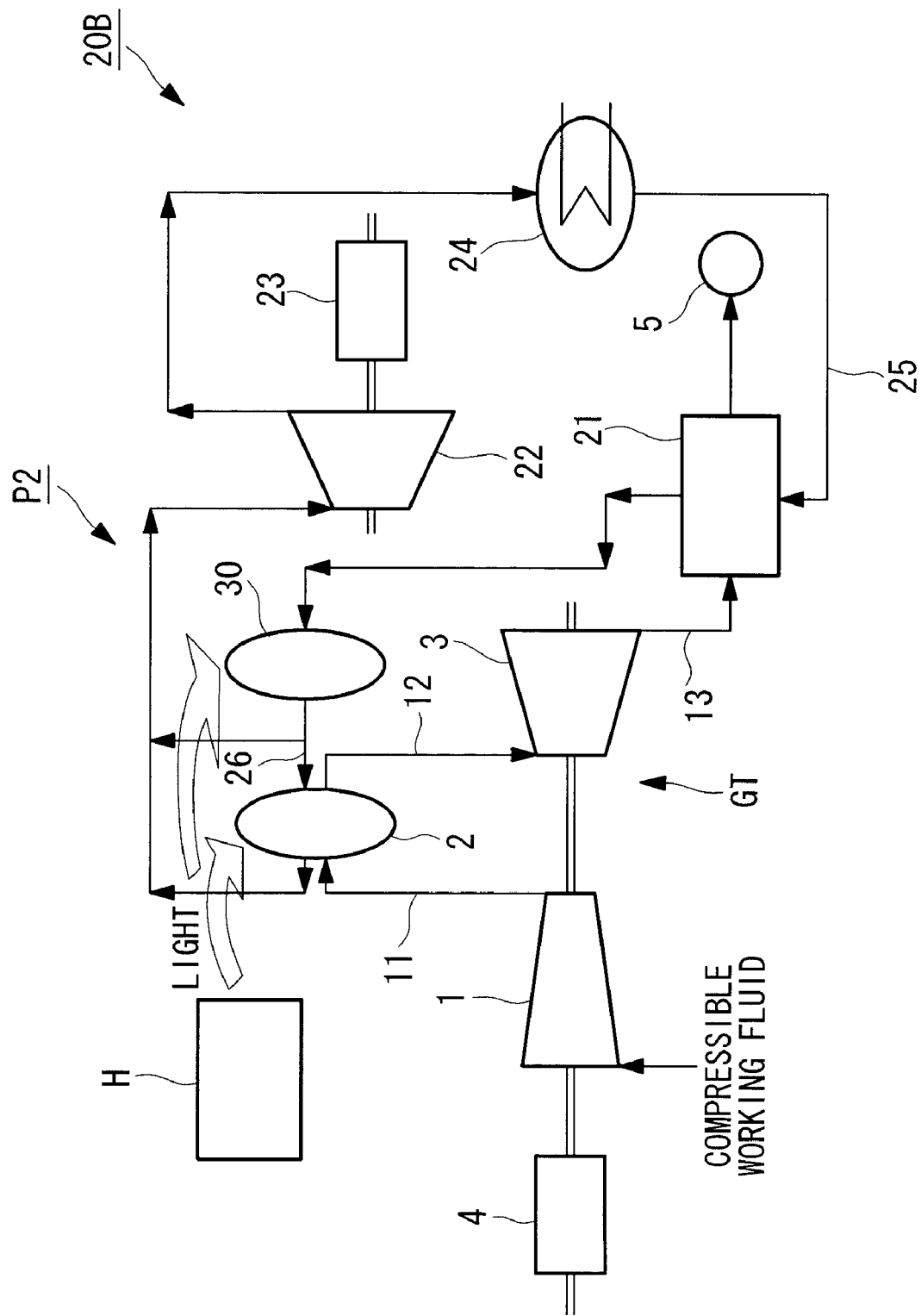
FIG. 2 is a configuration diagram (system diagram) showing a first modification of the solar-thermal gas turbine generator of the embodiment shown in FIG. 1.

Next, a first modification of this embodiment will be described on the basis of FIG. 2. Components identical to those in the above-described embodiment are given the same reference signs, and detailed descriptions thereof will be omitted.

In this first modification, a solar-thermal gas turbine generator P2 is provided with a cooling-steam supply flow path 26 that supplies steam generated at the solar-thermal steam generator 30 to the heat receiver 2 to perform cooling. The cooling-steam supply flow path 26 is a steam flow path that branches off from the piping flow path 25 at the downstream side of the solar-thermal steam generator 30 and that joins therewith at the upstream side of the steam turbine 22 via the heat receiver 2. Although not shown in the figure, it is desirable that a flow-rate adjusting valve or the like be provided at an appropriate location to adjust the amount of steam supplied to the heat receiver 2 depending on temperature conditions and so on.

In the heat receiver 2 that receives the sunlight to heat the high-pressure air, the cooling steam to be supplied to the heat receiver 2 via the cooling-steam supply flow path 26 flows inside numerous cooling-steam pipes (not shown) disposed between numerous air pipes (not shown) in which the high-temperature, high-pressure air flows and outer walls (not shown) to which insulating materials are attached, thereby minimizing heat transmission to the outer walls from the air pipes whose temperature becomes high. That is, due to the presence of the cooling-steam pipes in which steam having a lower temperature than the high-temperature, high-pressure air heated by the sunlight and a higher temperature than the outdoor air flows, a temperature difference between the air pipes in which the high-temperature, high-pressure air flows and the outdoor air is reduced. As a result, with regard to the heat receiver 2, cooling in which heat radiation (heat loss) from the high-temperature, high-pressure air to the outdoor air is suppressed becomes possible; therefore, it also becomes possible to reduce the thickness of the insulating materials.

Providing the above-described cooling-steam supply flow path 26 not only makes it possible to cool the heat receiver 2, but, because the degree of superheating of the steam increases in accordance with the amount of heat absorbed by cooling, the efficiency can also be increased by recovering heat with the steam turbine 22 operated by this steam.

Figure 3:
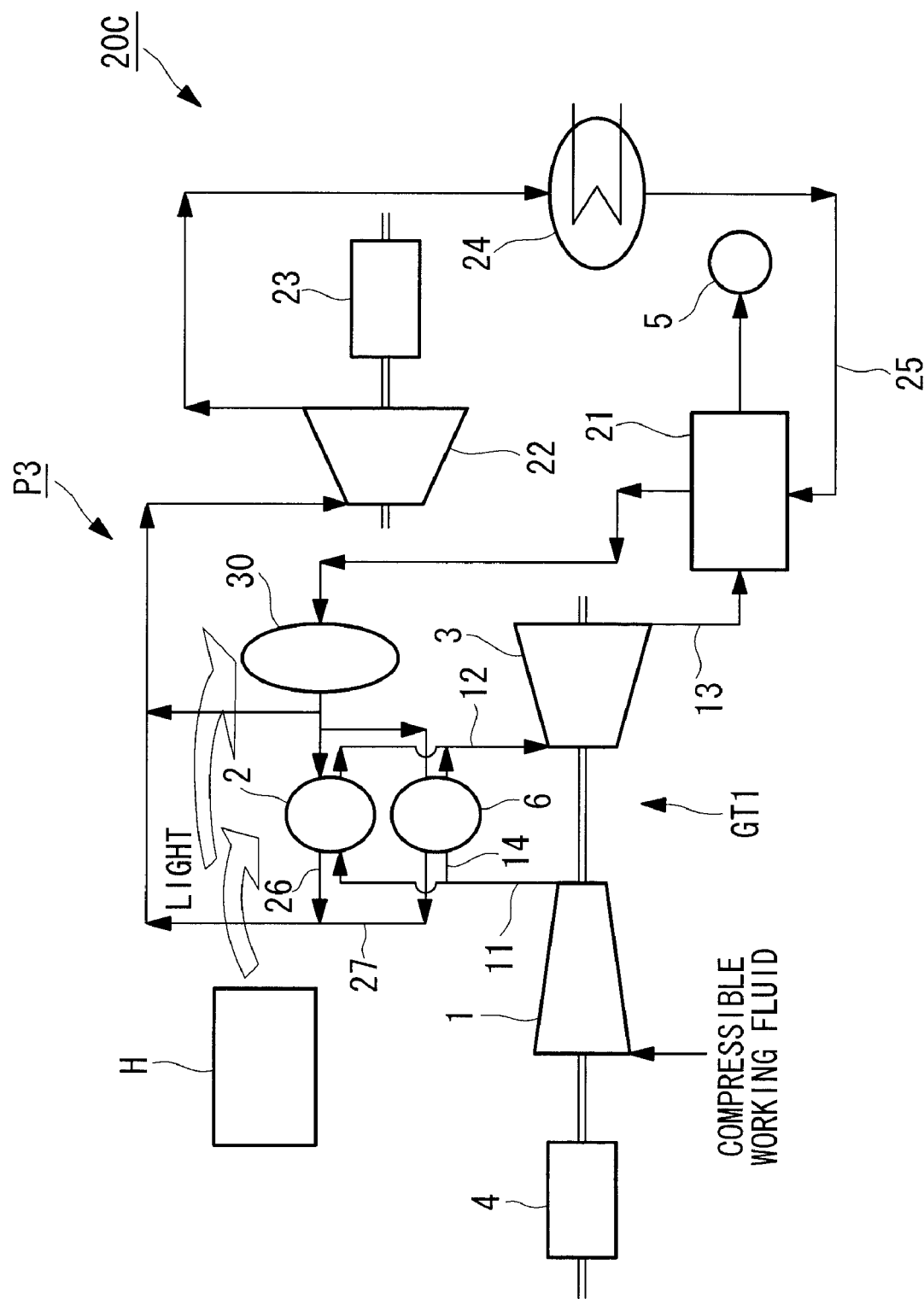
FIG. 3 is a configuration diagram (system diagram) showing a second modification of the solar-thermal gas turbine generator of the embodiment shown in FIG. 1.
Figure 4:
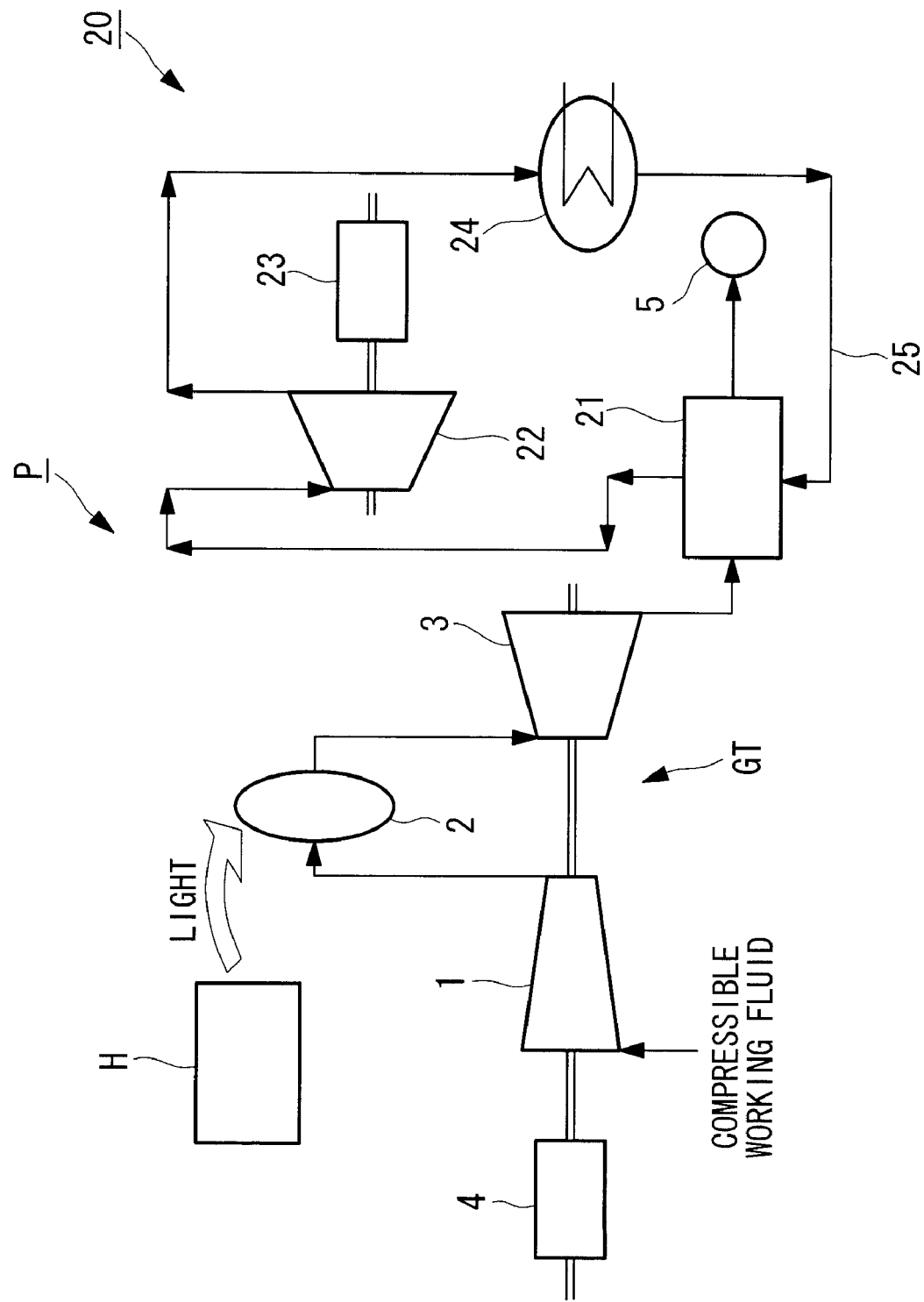
FIG. 4 is a configuration diagram (system diagram) showing a conventional example of a solar-thermal gas turbine generator.

Next, a second modification of this embodiment will be described on the basis of FIG. 3. Components identical to those in the above-described embodiment are given the same reference signs, and detailed descriptions thereof will be omitted.

In this second modification, a solar-thermal gas turbine generator P3 includes a solar-thermal gas turbine GT1 provided with a fossil-fuel-fired auxiliary combustor 6. Although the illustrated auxiliary combustor 6 is arranged in parallel with the heat receiver 2 via a bypass flow path 14, a series arrangement is also permissible. This auxiliary combustor 6 is used under operating conditions in which adequate sunlight cannot be obtained, in order to increase the heating ability of the high-pressure air.

In addition, this modification includes a cooling-steam supply flow path 27 that supplies the steam generated at the solar-thermal steam generator 30 to the auxiliary combustor 6 to cool the auxiliary combustor 6. This cooling-steam supply flow path 27 is a steam flow path that branches off from the piping flow path 25 at the downstream side of the solar-thermal steam generator 30 and that joins therewith at the upstream side of the steam turbine 22 via the auxiliary combustor 6. Although not shown in the figure, it is desirable that a flow-rate adjusting valve or the like be provided at an appropriate location to adjust the amount of steam supplied to the auxiliary combustor 6 in accordance with temperature conditions and so on.

In the auxiliary combustor 6 that burns fossil fuel, the cooling steam that is supplied to the auxiliary combustor 6 via the cooling-steam supply flow path 27 flows inside numerous cooling-steam pipes (not shown) disposed on the inner side of outer walls (not shown) to which insulating materials are attached, thereby cooling the auxiliary combustor 6 to inhibit a temperature rise. Since the degree of superheating of the steam that absorbs heat through this cooling increases, it is possible to increase the efficiency by recovering heat with the steam turbine 22.

The illustrated modification includes, similarly to the above-described first modification, the cooling-steam supply flow path 26 which supplies the steam generated at the solar-thermal steam generator 30 to the heat receiver 2 to perform cooling; therefore, an even greater amount of heat can be recovered with the steam turbine 22, and the efficiency enhancement is increased by a corresponding amount.

In this way, according to the present invention described above, when the solar heat intensity is decreased, all of the sunlight collected by the light collector H is directed to the solar-thermal steam generator 30, thereby making it possible to generator power only with the steam turbine 22. As a result, power generation becomes possible even under conditions in which operation has conventionally been impossible because power is generated using the sunlight, which is natural energy, and the thermal efficiency of a solar-thermal gas turbine generator is enhanced.

The present invention is not limited to the above-described embodiments, and appropriate modifications within a range that does not depart from the spirit thereof are permissible; for example, there is no limitation with regard to the presence or absence of the re-heater 5.

REFERENCE SIGNS LIST

1 compressor
2 heat receiver
3 turbine
4, 23 generator
5 chimney
6 auxiliary combustor
11 high-pressure air flow path
12 high-temperature, high-pressure air flow path
13 exhaust flow path
14 bypass flow path
20A to 20C steam power generation cycle
21 steam generator
22 steam turbine
24 surface condenser
25 piping flow path
26, 27 cooling-steam supply flow path
30 solar-thermal steam generator
P1 to P3 solar-thermal gas turbine generator
GT, GT1 solar-thermal gas turbine
H light collector

The invention claimed is:

1. A solar-thermal gas turbine generator comprising:
a solar-thermal gas turbine equipped with a compressor that takes in a compressible working fluid to raise a pressure thereof, a heat receiver that raises a temperature of the compressed working fluid by heating the working fluid with heat of sunlight collected by a light collector, and a turbine that converts heat energy held by a high-temperature, high-pressure compressible working fluid into mechanical energy;
a generator that is driven by the solar-thermal gas turbine to generate power; and
a steam power generation cycle in which the high-temperature compressible working fluid exhausted from the turbine is introduced into a steam generator, and in which a steam turbine that is operated by steam generated at the steam generator drives the generator to generate power,
wherein a solar-thermal steam generator that generates steam by being heated with heat collected by the light collector is provided upstream of the steam turbine of the steam power generation cycle, and
wherein the light collector is adjustable in accordance with sunlight intensity, and the light collector adjusts a distribution ratio for distributing the sunlight collected by the light collector to the heat receiver and the solar-thermal steam generator.

2. A solar-thermal gas turbine generator according to claim 1, wherein a cooling-steam supply flow path that performs cooling by supplying steam generated at the solar-thermal steam generator to the heat receiver is provided.

3. A solar-thermal gas turbine generator according to claim 1, wherein the solar-thermal gas turbine is provided with a fossil-fuel-fired auxiliary combustor, and a cooling-steam supply flow path that performs cooling by supplying steam generated at the solar-thermal steam generator to the auxiliary combustor is provided.

4. A solar-thermal gas turbine generator according to claim 2, wherein the solar-thermal gas turbine is provided with a fossil-fuel-fired auxiliary combustor, and a cooling-steam supply flow path that performs cooling by supplying steam generated at the solar-thermal steam generator to the auxiliary combustor is provided.

* * * * *